(12) United States Patent
Seo et al.

(10) Patent No.: US 9,116,025 B2
(45) Date of Patent: Aug. 25, 2015

(54) CAM-LOCKING DISSIMILAR MATERIAL SLEEVE

(71) Applicant: KOREA ATOMIC ENERGY RESEARCH INSTITUTE, Daejeon (KR)

(72) Inventors: Yong Chil Seo, Daejeon (KR); Kyung Min Jeong, Daejeon (KR); Ho Cheol Shin, Daejeon (KR)

(73) Assignee: KOREA ATOMIC ENERGY RESEARCH INSTITUTE (KR)

( * ) Notice: Subject to any disclaimer, the term of this patent is extended or adjusted under 35 U.S.C. 154(b) by 422 days.

(21) Appl. No.: 13/689,970

(22) Filed: Nov. 30, 2012

(65) Prior Publication Data

US 2014/0013873 A1   Jan. 16, 2014

(30) Foreign Application Priority Data

Jul. 13, 2012   (KR) .................. 10-2012-0076747

(51) Int. Cl.
*B25G 3/20* (2006.01)
*F16B 2/00* (2006.01)
*F16B 7/04* (2006.01)
*G01D 21/00* (2006.01)
*G21C 17/017* (2006.01)
*G21C 17/013* (2006.01)

(52) U.S. Cl.
CPC .............. *G01D 21/00* (2013.01); *G21C 17/013* (2013.01); *G21C 17/017* (2013.01); *Y10T 403/7051* (2015.01)

(58) Field of Classification Search
CPC ............. Y10T 403/7051; G01D 21/00; G21C 17/013; G21C 17/017
USPC .......... 403/28–30, 109.1, 179, 365, 367, 371, 403/372; 73/865.8, 866.5
See application file for complete search history.

(56) References Cited

U.S. PATENT DOCUMENTS

| 4,792,320 | A * | 12/1988 | Nickel .......................... 464/181 |
| 4,930,204 | A * | 6/1990 | Schurter ...................... 29/419.2 |
| 7,008,196 | B2 * | 3/2006 | Hokkirigawa et al. ..... 417/423.3 |
| 8,161,619 | B2 * | 4/2012 | Wanthal ......................... 29/460 |
| 2007/0189850 | A1 * | 8/2007 | Minowa ........................ 403/370 |
| 2008/0029284 | A1 * | 2/2008 | Chen et al. .................... 173/171 |
| 2010/0008715 | A1 * | 1/2010 | Minowa et al. ............... 403/203 |
| 2013/0004111 | A1 * | 1/2013 | Sadamura et al. ............ 384/572 |

* cited by examiner

*Primary Examiner* — Gregory Binda
*Assistant Examiner* — Nahid Amiri
(74) *Attorney, Agent, or Firm* — Cantor Colburn LLP

(57) ABSTRACT

A cam-locking dissimilar material sleeve installed on an outer surface of an expansion shaft of an inspection robot inserted into a heat transfer tube of a steam generator for generating nuclear power to inspect the heat transfer tube, the cam-locking dissimilar material sleeve includes: a tension part formed of steel and including a plurality of upwardly opened slits and a plurality of downwardly opened slits alternately formed in zigzags and legs formed between the upwardly opened slits and the downwardly opened slits; a plurality of upper contact parts formed of a synthetic resin through injection-molding to surround an upper end of the tension part and surround parts located between the upwardly opened slits; and a plurality of lower contact parts formed of a synthetic resin through injection-molding to surround a lower end of the tension part and surround parts located between the downwardly opened slits.

4 Claims, 5 Drawing Sheets

CAM-LOCKING DISSIMILAR MATERIAL SLEEVE

BACKGROUND OF THE INVENTION

1. Field of the Invention

The present invention relates to a cam-locking dissimilar material sleeve, and more particularly to a cam-locking dissimilar material sleeve which can maximize frictional force without generating plastic deformation.

2. Description of the Related Art

In general, a nuclear power plant mainly includes a nuclear steam supply system around a nuclear reactor, a power generation system such as a turbine for receiving steam and rotating a power generator, and other auxiliary facilities. The nuclear steam supply system is also referred to as a primary system, and the power generation system is also referred to as a secondary system.

Here, the nuclear reactor is an apparatus adapted to artificially control a fission chain reaction of fissile materials to generate heat or for various purposes such as production of radioactive isotopes and plutonium or formation of radiation fields, and is a core element of the primary system.

In the nuclear power generation, electric energy is obtained from steam generated by the nuclear steam supply system including a pressurizer, a steam generator, a main coolant pump, and a reactor where a nuclear fuel is provided, by the power generation system including a turbine and a power generator.

Here, the steam generator is adapted to convert liquid state water of low temperature into steam of high temperature and high pressure by using the heat generated during a nuclear fission, and the steam converted in the steam generator rotates the turbine and the power generator to generate power.

The steam generator includes a heat transfer tube including a plurality of pipes, in which case sludge may be accumulated in the heat transfer tube or the heat transfer tube may be deformed according to how many years the nuclear reactor has been operated. Further, damage such as a small crack may be generated in the heat transfer tube, and the life span of the steam generator may be shortened.

Thus, the steam generator manufacturer recommends the operator to periodically inspect the interior of the steam generator during a preventive maintenance period every year. Accordingly, the heat transfer tube is automatically inspected while an inspection robot installed within the steam generator is moved between heat transfer tubes.

For an inspection of the heat transfer tube, a sleeve is fitted with an expansion shaft installed in the inspection robot, and the expansion shaft with which the sleeve is fitted is inserted into the heat transfer tube. If the expansion shaft is inserted into the heat transfer tube, the sleeve is expanded while the expansion shaft is pulled down.

However, the sleeve according to the related art is mostly manufactured of a metal material, and thus, when expanded by the expansion shaft, the sleeve applies a stress to a surface of the heat transfer tube in contact with the sleeve, disadvantageously causing a flaw.

SUMMARY OF THE INVENTION

Accordingly, the present invention has been made keeping in mind the above problems occurring in the prior art, and an object of the present invention is to provide a cam-locking dissimilar material sleeve in which a tension part is manufactured of a metal material and upper and lower contact parts installed at upper and lower ends of the tension part are manufactured of a synthetic resin material, making it possible to maximize a frictional force with a heat transfer tube without generating a plastic deformation.

In accordance with one aspect of the present invention, there is provided a cam-locking dissimilar material sleeve installed on an outer surface of an expansion shaft of an inspection robot inserted into a heat transfer tube of a vapor generator for generating nuclear power to inspect the heat transfer tube, the dissimilar material sleeve including: a tension part formed of steel and including a plurality of upwardly opened slits and a plurality of downwardly opened slits alternately formed in zigzags and legs formed between the upwardly opened slits and the downwardly opened slits; a plurality of upper contact parts formed of a synthetic resin through injection-molding to surround an upper end of the tension part and surround parts located between the upwardly opened slits; and a plurality of lower contact parts formed of a synthetic resin through injection-molding to surround a lower end of the tension part and surround parts located between the downwardly opened slits.

Here, the tension part has a plurality of through-holes at upper and lower ends thereof so that a synthetic resin liquid is introduced into the through-holes when the upper contact parts and the lower contact parts are manufactured through injection-molding.

An upper inner surface of each of the upper contact part is tapered to become thinner as it goes toward the upper side, and a lower inner surface of each of the lower contact part is tapered to become thinner as it goes toward the inner side.

Each of the legs of the tension part is tapered such that opposite side surfaces thereof become narrower as they go toward the inner side, and each of the upper contact parts and the lower contact parts is tapered such that opposite side surfaces thereof become narrower as they go toward the inner side.

An upper expansion groove and a lower expansion groove are formed at a lower central portion of each of the upper contact parts and a lower central portion of each of the lower contact parts, respectively.

According to the cam-locking dissimilar material sleeve of the present invention, the tension part is formed of a metal material having an excellent resilient force while being free from a plastic deformation, and the upper and lower contact parts are formed of a synthetic resin, making it possible to maximize a frictional force with the heat transfer tube and minimizing an influence on the heat transfer tube.

Further, opposite side surfaces of each of the tension part, the upper contact parts, and the lower contact parts are tapered to become wider as they go toward the outer side, expanding a contact area with the heat transfer tube and improving a fixing force of the sleeve to the heat transfer tube.

In addition, a synthetic resin liquid forming the upper contact parts and the lower contact parts is introduced into the through-holes of the tension part, improving coupling forces between the tension part and the upper contact parts, and between the tension part and the lower contact parts.

DETAILED DESCRIPTION OF THE INVENTION

Hereinafter, a cam-locking dissimilar material sleeve according to an exemplary embodiment of the present invention will be described in detail with reference to the accompanying drawings.

Figure 1:
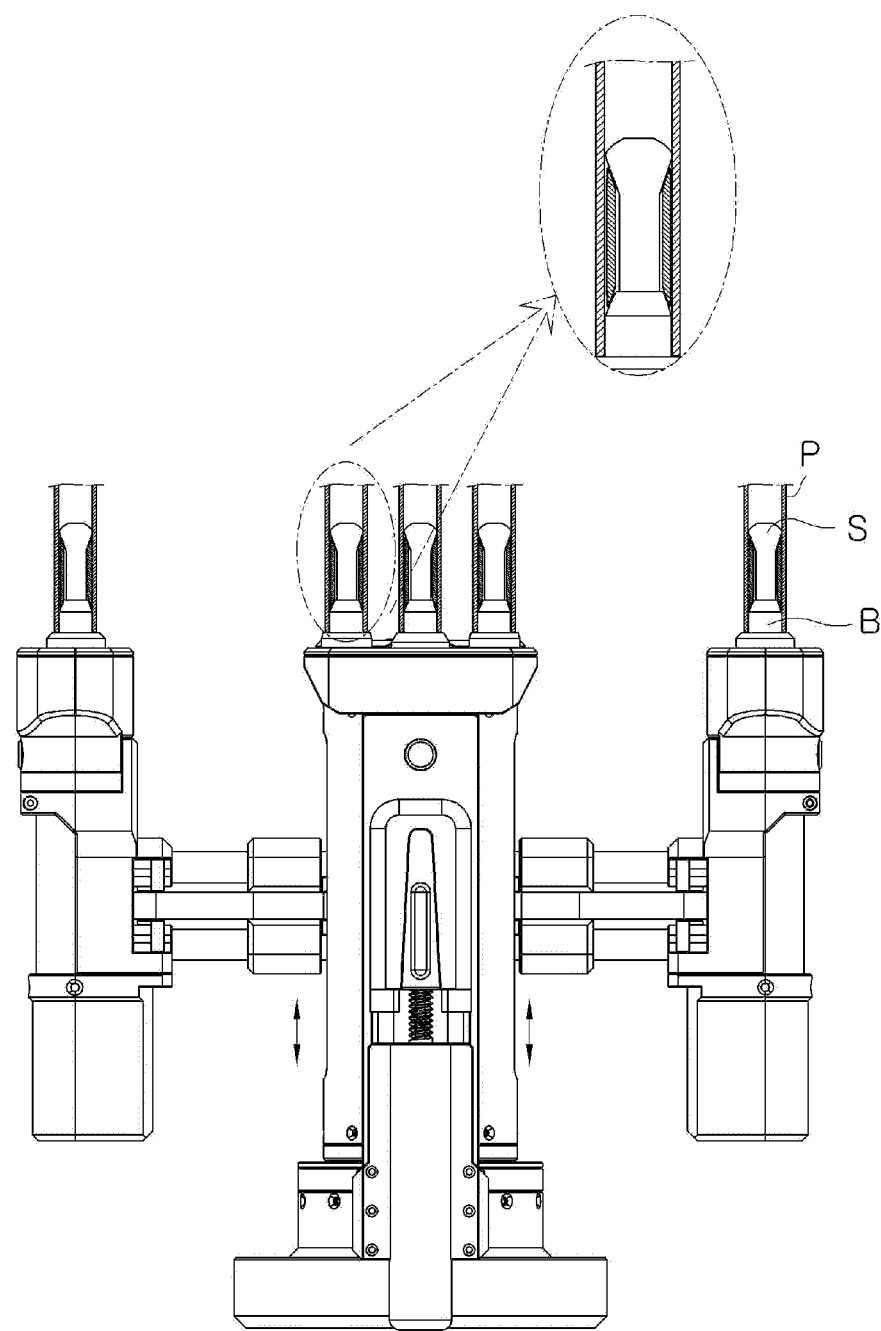
FIG. 1 is a view illustrating a cam-locking dissimilar material sleeve according to the present invention installed in a heat transfer tube.

FIG. 1 is a view illustrating that a cam-locking dissimilar material sleeve according to the present invention is installed in a heat transfer tube.

Figure 2:
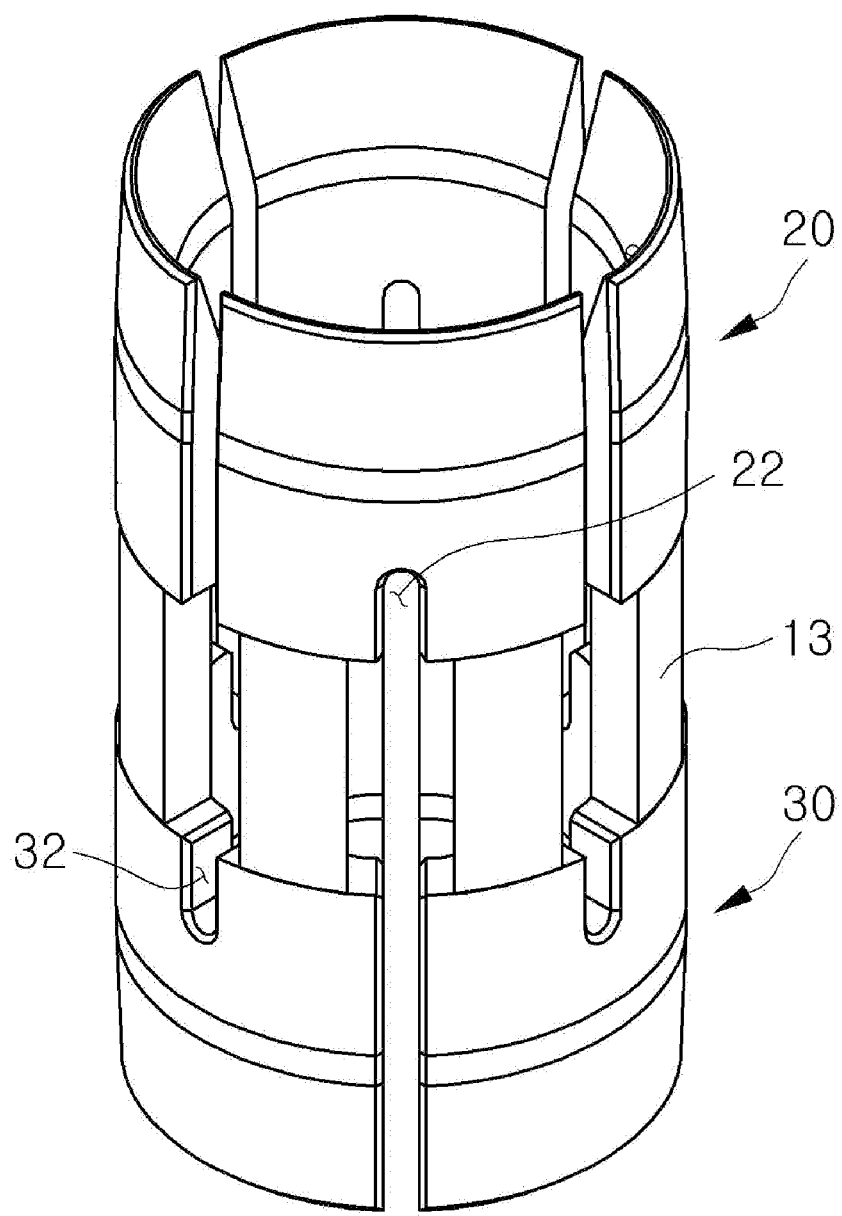
FIG. 2 is a perspective view of the cam-locking dissimilar material sleeve according to the present invention.
Figure 3:
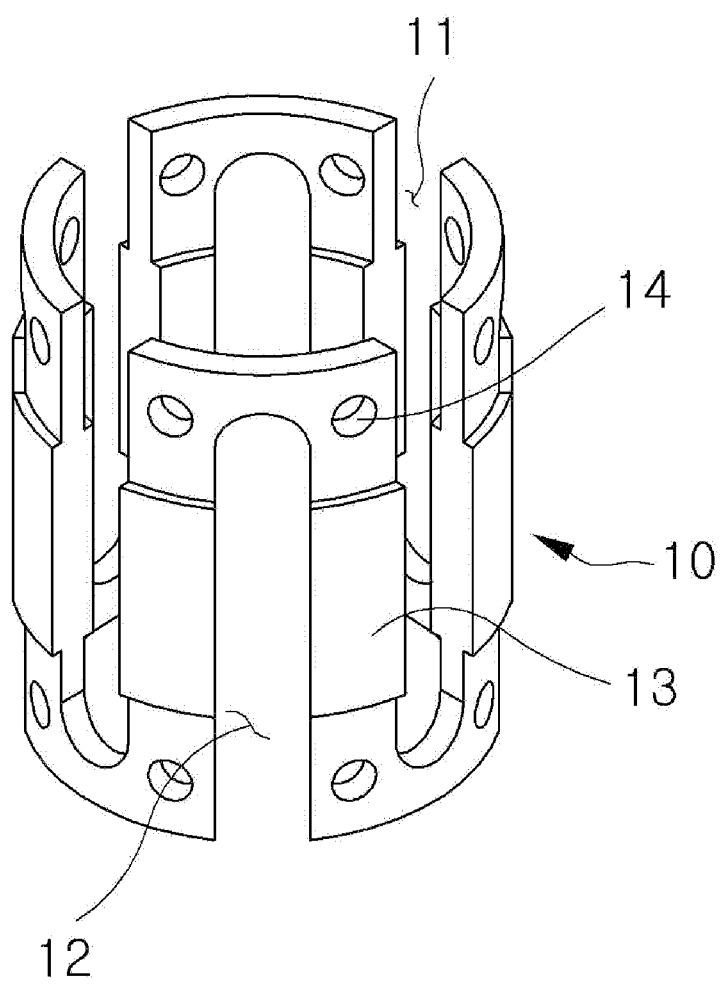
FIG. 3 is a perspective view illustrating a tension part of the cam-locking dissimilar material sleeve according to the present invention.
Figure 4:
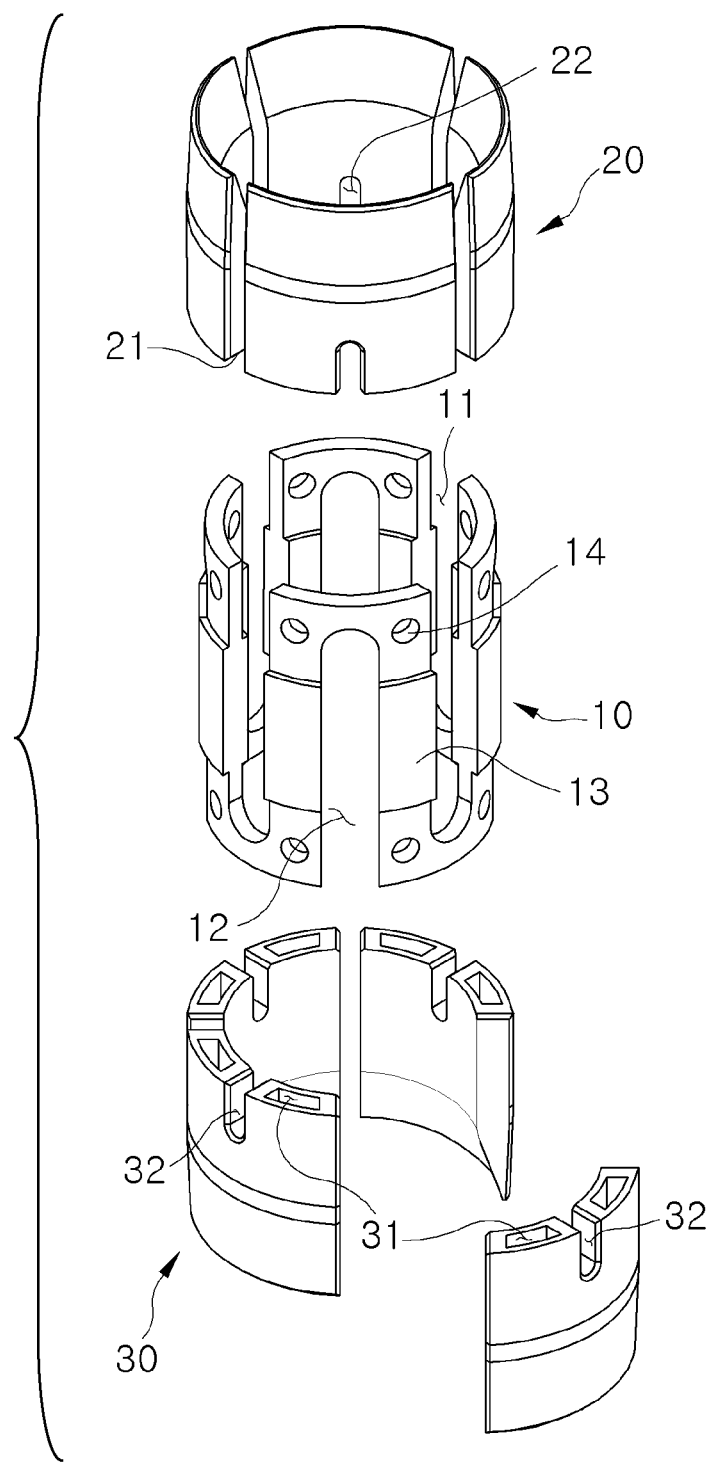
FIG. 4 is an upper contact part and a lower contact part of the cam-locking dissimilar material sleeve according to the present invention.

FIG. 2 is a perspective view of the cam-locking dissimilar material sleeve according to the present invention, FIG. 3 is a perspective view illustrating a tension part of the cam-locking dissimilar material sleeve according to the present invention, and FIG. 4 is an upper contact part and a lower contact part of the cam-locking dissimilar material sleeve according to the present invention.

Figure 5A:
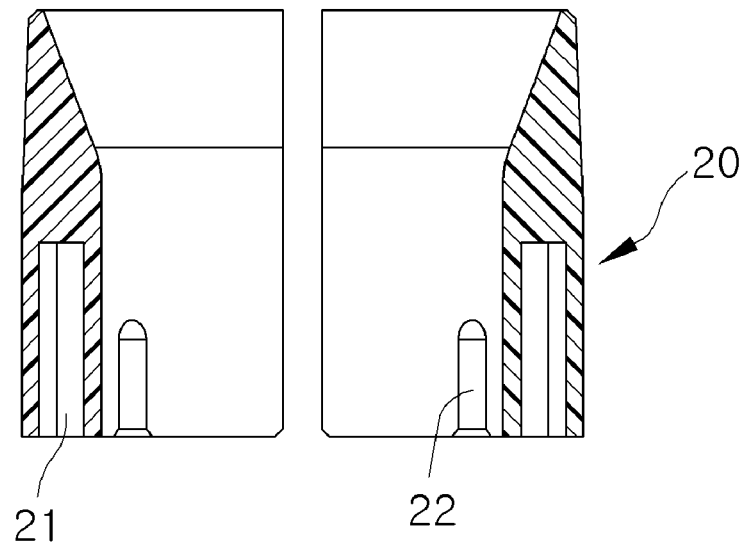
FIGS. 5A and 5B illustrate sections of the upper contact part and the lower contact part of the cam-locking dissimilar material sleeve according to the present invention.
Figure 5B:
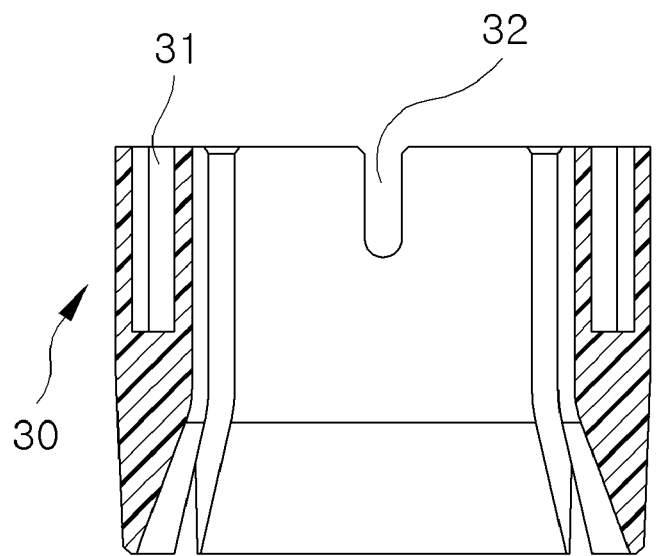

FIGS. 5A and 5B illustrate sections of the upper contact part and the lower contact part of the cam-locking dissimilar material sleeve according to the present invention.

The cam-locking dissimilar material sleeve according to the present invention is installed on an outer surface of an expansion shaft S of an inspection robot inserted into a heat transfer tube P of a steam generator for generating nuclear power to inspect the heat transfer tube P. The cam-locking dissimilar material sleeve includes a tension part 10, an upper contact part 20 installed at an upper end of the tension part 10, and a lower contact part 30 installed at a lower end of the tension part 10.

The tension part 10 has a substantially cylindrical tube shape and is formed of steel, and thus has so excellent a resilient force that the tension part 10 is easily restored to an original shape thereof if an external force is removed even when a predetermined deformation is generated.

In the tension part 10, a plurality of upwardly opened slits 11 and a plurality of downwardly opened slits are alternately formed in zigzags. That is, the upwardly opened slits 11 are formed at a predetermined interval, and the downwardly opened slits 12 are formed between the upwardly opened slits 11. Thus, legs 13 are formed between the upwardly opened slits 11 and the downwardly opened slits 12.

A plurality of through-holes 14 are formed at an upper end and a lower end of the tension part 10.

Each of the legs 13 is tapered such that opposite side surfaces thereof become narrower as it goes toward the inner side. That is, the opposite side surfaces of the leg 13 are tapered to become wider as they go toward the outer side, and if the opposite side surfaces of the leg 13 are tapered, a contact area between the sleeve of the present invention and the heat transfer tube P can be expanded, making it possible to improve a fixing force when an expansion shaft S of the inspection robot is inserted into the cam-locking dissimilar material sleeve of the present invention and then is inserted into the heat transfer tube P of the steam generator.

Meanwhile, the tension part 10 has a thick central portion, and an upper end and a lower end which are relatively thin as compared with the central portion thereof. The upper contact part 20 and the lower contact part 30 are installed at the upper and lower thin ends, respectively. That is, the through holes 14 of the tension part 10 are formed at the upper and lower thin ends of the tension part 10.

The upper contact part 20 is a part in contact with the expansion shaft S of the inspection robot and is formed of a synthetic resin. A plurality of upper contact parts 20 is disposed circularly at a predetermined interval to surround the upper end of the tension part 10, and surrounds parts located between the upwardly opened slits 11. In more detail, the upper contact part 20 is fixed to an upper end of the tension part 10 through injection-molding, in particular, through insert injection-molding. That is, a synthetic resin liquid is injected into an upper end of the tension part 10 formed of steel and then is hardened, so that the upper contact part 20 is installed at an upper end of the tension part 10. Thus, a leg insertion groove 21 into which the leg 13 of the tension part 10 is inserted is formed in the upper contact part 20. The leg insertion groove 21 formed in the upper contact part 20 has an upper closed end and a lower opened end.

An upper expansion groove 22 is formed at a lower central portion of the upper contact part 20.

As described above, the upper contact part 20 is manufactured through injection-molding, and when the upper contact part 20 is manufactured through injection-molding, the synthetic resin forming the upper contact part 20 is introduced into the through-hole 14 formed at the upper end of the tension part 10 and then is hardened. Thus, the upper contact part 20 can be fixed to the tension part 10 more firmly.

The upper contact part 20 is tapered such that an upper inner surface thereof becomes thinner as it goes toward the upper side. The upper inner surface of the upper contact part 20 is tapered to correspond to a taper of the expansion shaft S of the inspection robot so that the sleeve is expanded or restored as the expansion shaft S is moved.

Meanwhile, the upper contact part 20 is tapered such that opposite outer surfaces thereof become narrower as they go toward the inner side. If the opposite outer surfaces of the upper contact part 20 are tapered, a contact area between the sleeve of the present invention and the heat transfer tube P can be expanded, making it possible to improve a fixing force when an expansion shaft S of the inspection robot is inserted into the cam-locking dissimilar material sleeve of the present invention and then is inserted into the heat transfer tube P of the steam generator.

The lower contact part 30 is formed of a synthetic resin. A plurality of lower contact parts 20 is disposed circularly at a predetermined interval to surround the lower end of the tension part 10, and surrounds parts located between the downwardly opened slits 12. In more detail, the lower contact part 30 is fixed to a lower end of the tension part 10 through injection-molding, in particular, through insert injection-molding. That is, a synthetic resin liquid is injected into a lower end of the tension part 10 formed of steel and then is hardened, so that the lower contact part 30 is installed at a lower end of the tension part 10. Thus, a leg insertion groove 31 into which the leg 13 of the tension part 10 is inserted is formed in the lower contact part 30. The leg insertion groove 31 formed in the lower contact part 30 has a lower closed end and a lower opened end.

A lower expansion groove 22 is formed at a lower central portion of the lower contact part 30.

As described above, the lower contact part 30 is manufactured through injection-molding, and when the lower contact part 30 is manufactured through injection-molding, the synthetic resin forming the lower contact part 30 is introduced into the through-hole 14 formed at the lower end of the tension part 10 and then is hardened. Thus, the lower contact part 30 can be fixed to the tension part 10 more firmly.

The lower contact part 30 is tapered such that a lower inner surface thereof becomes thinner as it goes toward the lower side.

Meanwhile, the lower contact part 30 is tapered such that opposite outer surfaces thereof become narrower as they go toward the inner side. If the opposite outer surfaces of the lower contact part 30 are tapered, a contact area between the sleeve of the present invention and the heat transfer tube P can be expanded, making it possible to improve a fixing force when the lower contact part 30 is inserted into the cam-locking dissimilar material sleeve of the present invention and then is inserted into the heat transfer tube P of the steam generator by using the expansion shaft S of the inspection robot and a lower expansion bush B.

The cam-locking dissimilar material sleeve according to the present invention is expanded or restored when the expansion shaft S is moved, as the upper contact part 20 having the tapered upper inner surface corresponds to the tapered expansion shaft S and the lower contact part 30 having the tapered lower inner surface corresponds to the tapered lower expansion bush B.

Although the upper contact part 20 and the lower contact part 30 have been separately described to explain the cam-locking dissimilar material sleeve according to the present invention, they are manufactured in the same way and have substantially the same shape. Only, the installation locations thereof with respect to the tension part 10 are different. Thus, when the cam-locking dissimilar material sleeve according to the present invention is in use, any one of the upper contact part 20 and the lower contact part 30 may be located on the upper side and the effects of the elements of the upper contact part 20 and the lower contact part 30 are also the same.

What is claimed is:

1. A cam-locking dissimilar material sleeve capable of being installed on an outer surface of an expansion shaft of an inspection robot and inserted into a heat transfer tube of a steam generator to inspect the heat transfer tube, the dissimilar material sleeve comprising:
   a tension part formed of a metallic material and having a cylindrical shape;
   a plurality of upwardly opened slits opened toward an upper end portion of the tension part and a plurality of downwardly opened slits opened toward a lower end portion of the tension part, wherein the upwardly opened slits and the downwardly opened slits are arranged alternately around the cylindrical shape and with a predetermined angular distance to form a leg between two neighboring upwardly opened slit and downwardly opened slit and provide a resiliency to the tension part;
   a plurality of first through-holes formed around an upper portion only of the tension part and a plurality of second through-holes formed around a lower portion of the tension part;
   an upper contact part formed in an outside upper portion only of the tension part, wherein the upper contact part is formed only between two neighboring upwardly opened slits with the two neighboring upwardly opened silts remaining upwardly open; and
   a lower contact part formed in an outside lower portion of the tension part, wherein the lower contact part is formed only between two neighboring downwardly opened slits with the two neighboring downwardly opened slits remaining downwardly open, wherein the upper contact part and the lower contact part are formed of a synthetic resin and the synthetic resin is filled in the first and second through-holes to hold the upper and lower contact part.

2. The cam-locking dissimilar material sleeve of claim 1, wherein an upper inner surface of the upper contact part is tapered to become thinner toward the upper end portion and a lower inner surface of the lower contact part is tapered to become thinner toward the inner lower end portion.

3. The cam-locking dissimilar material sleeve of claim 1, wherein the leg is tapered such that opposite side surfaces thereof become narrower toward the inner side and the upper contact part and the lower contact part is tapered such that opposite side surfaces thereof become narrower toward the inner side.

4. The cam-locking dissimilar material sleeve of claim 1, wherein an upper expansion groove and a lower expansion groove are formed at a lower central portion of the upper contact part and a lower central portion of the lower contact part, respectively.

* * * * *